A. NAULT.
BOLTER-UP TOOL.
APPLICATION FILED NOV. 5, 1918.

1,333,333.

Patented Mar. 9, 1920.
2 SHEETS—SHEET 1.

Inventor
ARCHIE NAULT
Attorney
Fred C Matheny

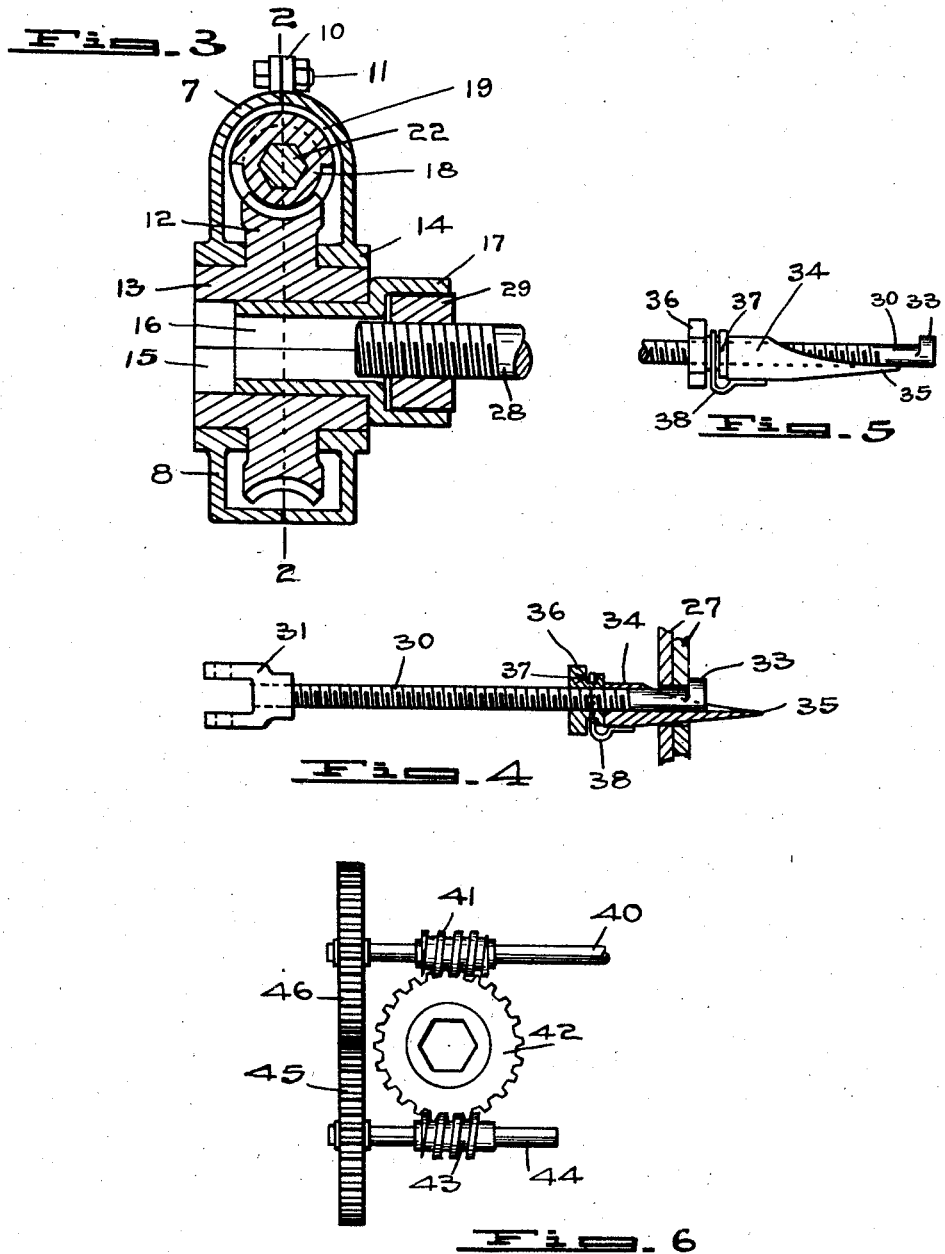

UNITED STATES PATENT OFFICE.

ARCHIE NAULT, OF PORTLAND, OREGON.

BOLTER-UP TOOL.

1,333,333.  Specification of Letters Patent.  Patented Mar. 9, 1920.

Application filed November 5, 1918. Serial No. 261,217.

*To all whom it may concern:*

Be it known that I, ARCHIE NAULT, a citizen of the United States, and resident of the city of Portland, in the county of Multnomah and State of Oregon, am the inventor of certain new and useful Improvements in Bolter-Up Tools, of which the following is a clear and exact specification.

This invention relates to improvements in power actuated nut turning devices and more especially to devices of this class that are adapted for tightening the nuts on bolts that are used for bolting together the plates that form the hull of large steel ships preparatory to the final riveting of such plates.

The object of this improvement is to provide a device of strong and simple construction by which power may be applied to turn a nut onto or off of a bolt.

A further object is to provide a nut tightening device that may be moved lengthwise along a driven shaft to turn nuts in various different positions, the driven shaft serving to transmit power to the nut tightener.

A still further object is to provide novel means for quickly and easily securing a motor that is connected with the driven shaft to the plates that are to be bolted together in such a manner that the motor and one end of the driven shaft will be supported by the plates.

Other and more specific objects will be apparent from the following description.

The objects hereinbefore stated are accomplished by devices illustrated in the accompanying drawings in which—

Figure 1:
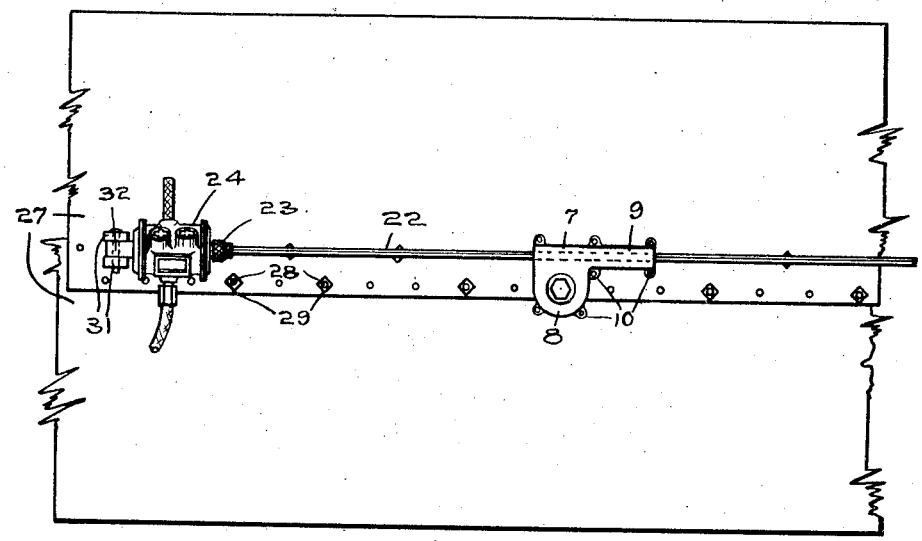
Figure 2:
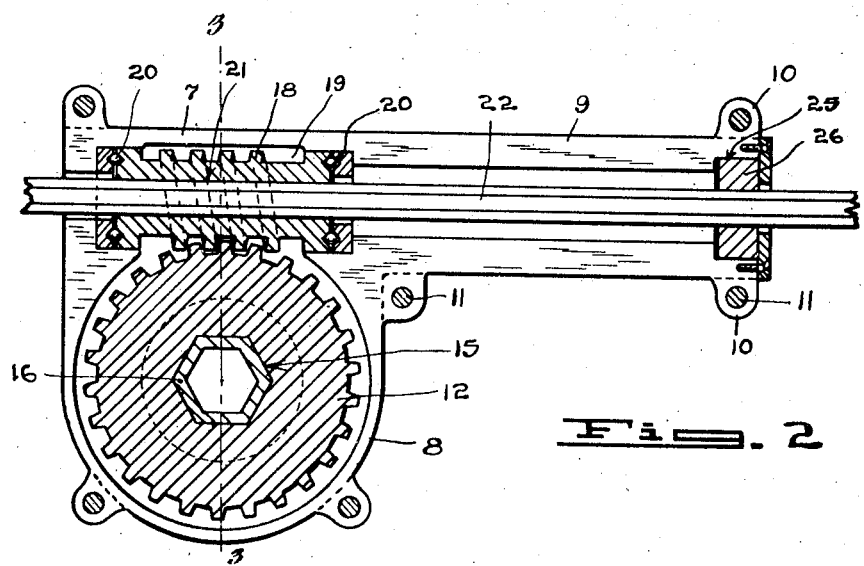

Figure 1 is a view in elevation of this nut turning device as it may appear when in use, fragments only of the plates that are being bolted together being shown. Fig. 2 is a view in longitudinal mid-section of the bolt turning device substantially on a broken line 2—2 of Fig. 3, certain parts being shown in elevation. Fig. 3 is a view in vertical cross section of the same on a broken line 3—3 of Fig. 2, showing the same as engaging a nut. Fig. 4 is a view in sectional elevation illustrating the motor supporting device. Fig. 5 is a fragmentary view in elevation showing parts of the motor supporting device in different positions from that shown in Fig. 4. Fig. 6 is a view in elevation illustrating a modified form of driving gear for the mechanism that turns that nut.

In the construction of large steel ships the plates that form the hull of the ship must be bolted together preparatory to riveting. These plates are often warped and sprung in such a manner that it requires a great deal of time and labor to screw the nuts on the bolts where a common hand wrench is used. The present invention makes it possible to utilize power for the purpose of turning the nuts thereby effecting a great saving in time and labor.

Referring to the drawings, throughout which like reference numerals designate like parts, the numeral 7 designates the casing or housing of a nut tightener, such housing comprising a circular worm wheel receptacle 8 and a tangentially arranged tubular element 9 that serves as a worm and shaft receptacle and as a handle.

The casing 7 is preferably made in two parts, divisible on the medial plane, as more clearly shown in Fig. 3, and each of the parts is provided at frequent intervals with lugs 10 through which bolts 11 may be passed to secure said two parts together, the two part construction of the casing permitting the interior mechanism to be quickly and easily assembled therein.

Within the circular portion 8 of the housing is disposed a worm wheel 12 that is provided with suitable hub portions 13 that are journaled in bearings 14 in two sides of the housing.

The center of the worm wheel 12 is provided with an axial passageway 15 preferably of hexagonal shape for the reception of a hexagonal shaped shank 16 on the end of a socket wrench 17. The shank 16 is hollow so that a clear passageway is left through the worm wheel 12 through which a bolt may project.

The worm wheel 12 is disposed to mesh with a worm 18 located within a worm housing 19 in the casing 7.

The worm 18 is provided at each end with ball bearings 20 to receive the end thrust and is journaled for rotation within the housing 7.

The worm 18 is also provided with an axial passageway 21 preferably of hexagonal shape through which may be passed a hexagonal shaft that is adapted to extend to and be inserted within the chuck 23 of a suitable air motor 24 as more clearly shown in Fig. 1.

The outer end of the handle element 9 may be recessed as at 25 to form a bearing for a disk 26 that is provided with a hexagonal axial passageway for the passage of the shaft 22 and serves to steady and support the shaft 22 within the outer end of the handle element 9.

The shaft 22 is free to move through the worm 18 and bearing disk 26 so that the housing 7 may be moved into any desired position along the shaft to bring the socket wrench 17 opposite the nut that is to be tightened.

In Fig. 1 I have illustrated fragments of two plates 27 which have been secured together by bolts 28 upon which nuts 29 are to be tightened, and have shown this nut tightening apparatus disposed in an operative position with respect to the work.

The motor 24 is supported from the plates 27 by means of a threaded shank 30 that is provided on its outer end with a bifurcated bracket 31 adapted for the reception of a lug 32 on the end of the air motor 24. The inner end of the shank 30 is provided with a head 33 that projects from one side only of such shank and is small enough so that it may be inserted through the holes in the plates 27 as shown in Fig. 4.

The head 33 is secured in engagement with the plates 27, after it has been inserted in the holes in such plates, by means of a sleeve 34 that is movable on the shank 30 and is provided with a tapered lower portion 35 adapted to project within the holes in the plates 27 and hold the shank 30 in such a position that the head 33 will engage with the plates 27 and can not be withdrawn therefrom until the sleeve 34 is withdrawn.

The sleeve 34 is adapted to be crowded into the holes in the plates 27 by turning a nut 36 that is secured upon the shank 30. The nut 36 is provided with an annular groove 37 for the reception of the bifurcated arms of a member 38 by which the sleeve 34 will be withdrawn when the nut 36 is moved outwardly on the shank 30.

The bifurcated bracket 31 is preferably screwed onto the outer end of the shank 30 so that it will turn thereon, thus permitting the outer end of the shaft 22 to be swung through an angle to bring the wrench 17 opposite the nut that is to be tightened.

When the shank 30 is to be inserted within a hole in the plates 27 the sleeve 34 is withdrawn into the position shown in Fig. 5, the head 33 is then passed through the hole and the wedge like projection 35 is crowded into the hole by turning the nut 36 thereby rigidly securing the shank 30 to the plates 27 from which it will project substantially at right angles.

The worm 18 and worm wheel 12 serve as means for greatly reducing the speed and multiplying the power of the motor 24, the gear ratio and design and power rating of the various parts, preferably being such that for a bolt of given size the motor 24 will be stalled before the threads of the nut that is being tightened will be stripped or the bolt will be twisted off.

In operation the device is set up as shown in Fig. 1, the operator then adjusts the nut tightener to the nut that is to be tightened and starts the motor 24 to rotate the shaft 22 and cause the nut to be turned.

A particular advantage of this nut tightening device resides in the fact that practically the entire weight of the motor and a portion of the weight of the shaft 22 is supported by the shank 30 regardless of whether the device is used on horizontal, vertical or angularly disposed plates, as on the bottom, sides or deck of a ship.

The shaft 22 not only serves as a driving shaft but also serves to resist the force that tends to turn the casing 7 when a nut is being tightened on a bolt.

It will be readily seen that if the wrench socket 17 is driven in one direction, as for instance in a clockwise direction to tighten nuts, when in the position shown in Fig. 1 that such wrench socket will be driven in a contra-clockwise direction if the casing 7 is turned over by rotating it about the shaft 22 through one half of one complete revolution and inserting the wrench in the opposite side thereof thus making it convenient to loosen as well as tighten nuts without reversing the direction of rotation of the motor.

I also contemplate the provision of a reamer having a shank adapted to fit within the socket 15 and be rotated thereby so that the wrench 17 may be removed and the reamer inserted for reaming holes if desired.

The projecting end 9 of the casing serves as a handle by which the operator may hold the device, thereby obviating the necessity of grasping the rotating shaft 22.

In Fig. 6 I have shown a modified form of gear mechanism for accomplishing the turning of the worm wheel such gear mechanism comprising a driven shaft 40 corresponding to the shaft 22 upon which is a worm corresponding to the worm 18 that meshes with a worm wheel 42 corresponding to the worm wheel 12.

For the purpose of causing the strain to be borne by a greater number of teeth on the worm wheel 42 where excessive turning force is to be exerted I contemplate the provision of an additional worm 43 disposed on a shaft 44 and adapted to mesh with the worm wheel 42, at a point opposite the worm 41, the shaft 44 being connected with the shaft 40 by means of gear wheels 45 and 46 of equal size so that the worms 41 and 43 will be rotated at the same speed and will mutually coöperate to drive the worm wheel 42.

The device shown in Fig. 6 may be placed in any desired form of housing which may be a modification of the form shown in Figs. 1 to 5.

It is obvious that changes in the precise form of construction of the various parts of this device may be resorted to within the scope of the following claims.

What I claim is—

1. In a bolter up for the hull plates of steel ships, an air motor, means for pivotally securing said air motor to said hull plates, a shaft extending substantially parallel with said hull plates and driven by said air motor, and a nut turning device movable lengthwise along said shaft and arranged to be driven thereby.

2. A device of the class described comprising a power unit, means for pivotally supporting said power unit, a shaft driven by said power unit, a casing, a worm mounted within said casing, the said shaft being adapted to slidably project through said worm and drive said worm, a worm wheel journaled in said casing and meshing with said worm and means connected with the hub portion of said worm for engaging with and turning a nut when said worm wheel is rotated.

3. A support adapted to stand at right angles to a perforated plate comprising a threaded shank, a head on the inner end thereof and projecting from one side only of said shank, said head being adapted to pass through a perforation in said plate, a sleeve movable on said shank and having a tapered end extension adapted to project within said perforation in said plate on the side of said shank opposite said head portion, and a nut on said shank for advancing and withdrawing said sleeve.

Signed at Portland, Oregon, this 28th day of October, 1918.

ARCHIE NAULT.